(12) United States Patent
Nilsson et al.

(10) Patent No.: US 10,623,116 B2
(45) Date of Patent: Apr. 14, 2020

(54) METHOD AND RADIO NETWORK NODE FOR DETERMINING TOTAL RADIATED POWER FROM A PLURALITY OF ANTENNAS

(71) Applicant: TELEFONAKTIEBOLAGET LM ERICSSON (PUBL), Stockholm (SE)

(72) Inventors: Kajsa Nilsson, Huddinge (SE); Christian Braun, Vallentuna (SE); Farshid Ghasemzadeh, Sollentuna (SE); Tadashi Mizota, Tyresö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/330,803

(22) PCT Filed: Oct. 4, 2016

(86) PCT No.: PCT/SE2016/050941
§ 371 (c)(1),
(2) Date: Mar. 6, 2019

(87) PCT Pub. No.: WO2018/067043
PCT Pub. Date: Apr. 12, 2018

(65) Prior Publication Data
US 2019/0199453 A1 Jun. 27, 2019

(51) Int. Cl.
*H04B 17/10* (2015.01)
*H04B 17/12* (2015.01)
(Continued)

(52) U.S. Cl.
CPC ........... *H04B 17/102* (2015.01); *H04B 17/12* (2015.01); *H04W 52/225* (2013.01); *H04W 52/24* (2013.01)

(58) Field of Classification Search
CPC ........ H04B 17/102; H04B 17/12; H04B 7/06; H04B 7/0615; H04B 17/0085; H04W 5/255; H04W 5/24; H04W 88/08
See application file for complete search history.

(56) References Cited

U.S. PATENT DOCUMENTS

2004/0209579 A1* 10/2004 Vaidyanathan ...... H04B 7/0615
455/101
2009/0279486 A1* 11/2009 Kishigami ............ H04W 52/42
370/329

(Continued)

FOREIGN PATENT DOCUMENTS

EP     1608082 A2    12/2005

OTHER PUBLICATIONS

International Search Report and Written Opinion, dated May 31, 2017, from corresponding/related PCT Application No. PCT/SE2016/050941.

*Primary Examiner* — Thanh C Le
(74) *Attorney, Agent, or Firm* — Patent Portfolio Builders PLLC (57) ABSTRACT

The method is performed in a radio network node and comprises the steps of: obtaining antenna data affecting transmission weights applied for each individual antenna of the plurality of antennas; obtaining an intermediate power value based on a sum of signals from couplers provided by each antenna of the plurality of antennas; determining a power factor based on the antenna data; and calculating the total radiated power based on the intermediate power value and the power factor.

20 Claims, 4 Drawing Sheets

(51) Int. Cl.
*H04W 52/22* (2009.01)
*H04W 52/24* (2009.01)

(56) References Cited

U.S. PATENT DOCUMENTS

| | | |
|---|---|---|
| 2011/0085490 A1 | 4/2011 | Schlee |
| 2013/0121438 A1* | 5/2013 | Murakami ........... H04B 7/0456 375/295 |
| 2017/0141834 A1* | 5/2017 | Yang ........................ H04B 7/06 |
| 2017/0171011 A1* | 6/2017 | Zhang ..................... H04L 27/34 |

* cited by examiner

METHOD AND RADIO NETWORK NODE FOR DETERMINING TOTAL RADIATED POWER FROM A PLURALITY OF ANTENNAS

TECHNICAL FIELD

The invention relates to a method, radio network nodes, a computer program and a computer program product for determining total radiated power from a plurality of antennas.

BACKGROUND

When radio base stations are deployed, the performance in radio often needs to be monitored. In some countries e.g. Japan and Korea, there are mandatory requirements for regular measurements of radio performance of active radio base stations. During the measurement, traffic in the cell should not be switched off, whereby the radio base station shall remain in a normal transmitting state during the measurement.

Measurements on radio performance can be derived through either a fixed mounted RF (radio frequency) directional coupler, connected directly on each of the radio base station antenna connectors, or through an RF directional coupler housed inside the radio base station equipment and accessible through one extra connector per antenna connector.

New radio base stations are being developed, e.g. for 5G (fifth generation). These radio base stations operate at higher frequencies where beamforming is necessary in order to achieve sufficient coverage and performance. This implies that the number of transmitter and receiver chains are increased greatly compared to previous generations of radio base stations. Consequently, AAS (Active Antenna System) are commonly developed for such radio base stations. Previous generations of radio base stations normally have 2 or 4 transmitter and receiver chains at the most, while the AAS radio base station may have e.g. 32, 64, 128, 256 or even 512 transmitter and receiver chains depending on operating frequency and deployment. One of many parameters which make sense to be measured for AAS radio base stations, is total radiated power, encompassing the power for all transmitter chains.

Moreover, many AAS radio base station have the antennas integrated, whereby the use of externally fixed mounted external direction couplers for measuring power is not feasible.

For AAS with a higher number of antennas, adding connectors for each transmitter chain is not a feasible solution, since that would significantly impact size requirements and would increase complexity greatly. For mm-wave frequencies, due to high level of integration needed for technology, the problem is even more accentuated.

SUMMARY

It is an object to provide a solution to determine total radiated power in a radio network node which can be employed when in a radio network node which uses a large number of antennas.

According to a first aspect, it is presented a method for determining total radiated power from a plurality of antennas. The method is performed in a radio network node and comprises the steps of: obtaining antenna data affecting transmission weights applied for each individual antenna of the plurality of antennas; obtaining an intermediate power value based on a sum of signals from couplers provided by each antenna of the plurality of antennas; determining a power factor based on the antenna data; and calculating the total radiated power based on the intermediate power value and the power factor.

The antenna data may comprise transmission weights applied for each individual antenna of the plurality of antennas.

The method may further comprise the step of: obtaining feedback factors for each coupler feedback line. In such a case, the step of determining a power factor is also based on the feedback factors.

The step of determining a power factor may comprise determining the power factor according to:

$$BF_{comp} = \frac{\sum_{n=1}^{N} |w_n c_n|^2}{\left|\sum_{n=1}^{N} w_n c_n\right|^2},$$

where $BF_{comp}$ is the power factor, N is the number of antennas, $w_n$ is the transmission weight for antenna n, and $c_n$ is the feedback factor for coupler connected to antenna n.

The method may further comprise the step of: obtaining transmission signal values for each antenna of the plurality of antennas. In such a case, the step of determining a power factor is also based on the transmission signal values.

The step of determining a power factor may comprise determining the power factor according to:

$$BF_{comp} = \frac{\sum_{i=1}^{I} \sum_{n=1}^{N} |s_i w_{n,i} c_n|^2}{\left|\sum_{i=1}^{I} \sum_{n=1}^{N} s_i w_{n,i} c_n\right|^2},$$

where $BF_{comp}$ is the power factor, N is the number of antennas, $s_i$ is the transmission signal value for layer i, $w_{n,i}$ is the transmission weight for antenna n and layer i, and $c_n$ is the feedback factor for coupler connected to antenna n.

The step of determining a power factor may comprise determining the average power factor for a predetermined time period.

The step of determining a power factor may comprise averaging the power factor in a frequency domain.

The step of calculating the total radiated power may comprise calculating the total radiated power by multiplying the intermediate power value by the power factor.

According to a second aspect, it is presented a radio network node for determining total radiated power from a plurality of antennas. The radio network node comprises: a processor; and a memory storing instructions that, when executed by the processor, cause the radio network node to: obtain antenna data affecting transmission weights applied for each individual antenna of the plurality of antennas; obtain an intermediate power value based on a sum of signals from couplers provided by each antenna of the plurality of antennas; determine a power factor based on the antenna data; and calculate the total radiated power based on the intermediate power value and the power factor.

The antenna data may comprise transmission weights applied for each individual antenna of the plurality of antennas.

The radio network node may further comprise instructions that, when executed by the processor, cause the radio network node to: obtain feedback factors for each coupler feedback line. In such a case, the instructions to determine a power factor comprise instructions that, when executed by the processor, cause the radio network node to determine the power factor also based on the feedback factors.

The instructions to determine a power factor may comprise instructions that, when executed by the processor, cause the radio network node to determine the power factor according to:

$$BF_{comp} = \frac{\sum_{n=1}^{N} |w_n c_n|^2}{\left|\sum_{n=1}^{N} w_n c_n\right|^2},$$

where $BF_{comp}$ is the power factor, N is the number of antennas, $w_n$ is the transmission weight for antenna n, and $c_n$ is the feedback factor for coupler connected to antenna n.

The radio network node may further comprise the instructions that, when executed by the processor, cause the radio network node to: obtain transmission signal values for each antenna of the plurality of antennas. In such a case, the instructions to determine a power factor comprise instructions that, when executed by the processor, cause the radio network node to determine the power factor also based on the transmission signal values.

The instructions to determine a power factor may comprise instructions that, when executed by the processor, cause the radio network node to determine the power factor according to:

$$BF_{comp} = \frac{\sum_{i=1}^{I} \sum_{n=1}^{N} |s_i w_{n,i} c_n|^2}{\left|\sum_{i=1}^{I} \sum_{n=1}^{N} s_i w_{n,i} c_n\right|^2},$$

where $BF_{comp}$ is the power factor, N is the number of antennas, $s_i$ is the transmission signal value for layer i, $w_{n,i}$ is the transmission weight for antenna n and layer i, and $c_n$ is the feedback factor for coupler connected to antenna n.

The instructions to determine a power factor may comprise instructions that, when executed by the processor, cause the radio network node to determine the average power factor for a predetermined time period.

The instructions to determine a power factor may comprise instructions that, when executed by the processor, cause the radio network node to average the power factor in a frequency domain.

The instructions to determine a power factor may comprise instructions that, when executed by the processor, cause the radio network node to average the power factor in a frequency domain.

The instructions to calculate the total radiated power may comprise instructions that, when executed by the processor, cause the radio network node to calculate the total radiated power by multiplying the intermediate power value by the power factor.

According to a third aspect, it is presented a radio network node comprising: means for obtaining antenna data affecting transmission weights applied for each individual antenna of a plurality of antennas; means for obtaining an intermediate power value based on a sum of signals from couplers provided by each antenna of the plurality of antennas; means for determining a power factor based on the antenna data; and means for calculating the total radiated power based on the intermediate power value and the power factor.

According to a fourth aspect, it is presented a computer program for determining total radiated power from a plurality of antennas. The computer program comprises computer program code which, when run on a radio network node causes the radio network node to: obtain antenna data affecting transmission weights applied for each individual antenna of the plurality of antennas; obtain an intermediate power value based on a sum of signals from couplers provided by each antenna of the plurality of antennas; determine a power factor based on the antenna data; and calculate the total radiated power based on the intermediate power value and the power factor.

According to a fifth aspect, it is presented a computer program product comprising a computer program according to the fourth aspect and a computer readable means on which the computer program is stored.

Whenever used herein, the phrase 'radio network node' is to be interpreted as a node used for radio communication in a cellular communication network. The network node can e.g. be a radio base station.

Whenever used herein, the phrase 'transmission weight' is to be interpreted as a weight used as a factor when transmitting a signal. Can e.g. be used for beam forming when transmission weights are applied for multiple antennas.

Whenever used herein, the phrase 'total radiated power' is to be interpreted as a power value representing a sum of radiated power from a plurality of antennas.

Whenever used herein, the phrase 'intermediate power value' is to be interpreted as a power value obtained by adding signals from couplers connected to respective antennas.

Whenever used herein, the phrase 'transmission signal value' is to be interpreted as a value of a transmission signal to be transmitted by an antenna.

Whenever used herein, the phrase 'power factor' is to be interpreted as a factor used when converting between intermediate power value and total radiated power. The power factor is dynamic and thus changes over time based on i.a. transmission weight.

Whenever used herein, the phrase 'feedback factor' is to be interpreted as an attenuation/amplification factor of a feedback loop through a coupler and connected circuitry.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
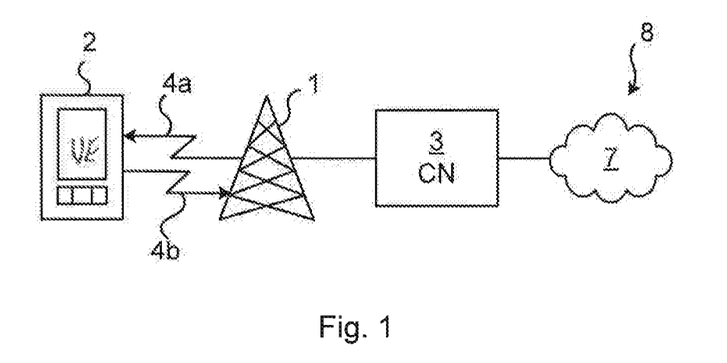
FIG. 1 is a schematic diagram illustrating a cellular communication network where embodiments presented herein may be applied.

FIG. 1 is a schematic diagram illustrating a cellular communication network 8 where embodiments presented herein may be applied. The cellular communication network 8 comprises a core network 3 and one or more radio network nodes 1, here in the form of radio base stations being evolved Node Bs, also known as eNode Bs or eNBs. The radio network node 1 could also be in the form of Node Bs, BTSs (Base Transceiver Stations) and/or BSSs (Base Station Subsystems), etc. The radio network node 1 provides radio connectivity over a wireless interface 4a-b to a plurality of wireless devices 2.

The term wireless device is also known as mobile communication terminal, user equipment (UE), mobile terminal, user terminal, user agent, wireless terminal, machine-to-machine device etc., and can be, for example, what today are commonly known as a mobile phone, smart phone or a tablet/laptop with wireless connectivity. The term wireless is here to be construed as having the ability to perform wireless communication. More specifically, the wireless device 2 can comprise a number of wires for internal and/or external purposes.

The cellular communication network 8 may e.g. comply with any one or a combination of 5G networks, LTE (Long Term Evolution), LTE-Advanced, W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, as long as the principles described hereinafter are applicable.

Over the wireless interface, downlink (DL) communication 4a occurs from the radio network node 1 to the wireless device 2 and uplink (UL) communication 4b occurs from the wireless device 2 to the radio network node 1. The quality of the wireless radio interface to each wireless device 2 can vary over time and depending on the position of the wireless device 2, due to effects such as fading, multipath propagation, interference, etc.

The radio network node 1 is also connected to the core network 3 for connectivity to central functions and a wide area network 7, such as the Internet.

Figure 2:
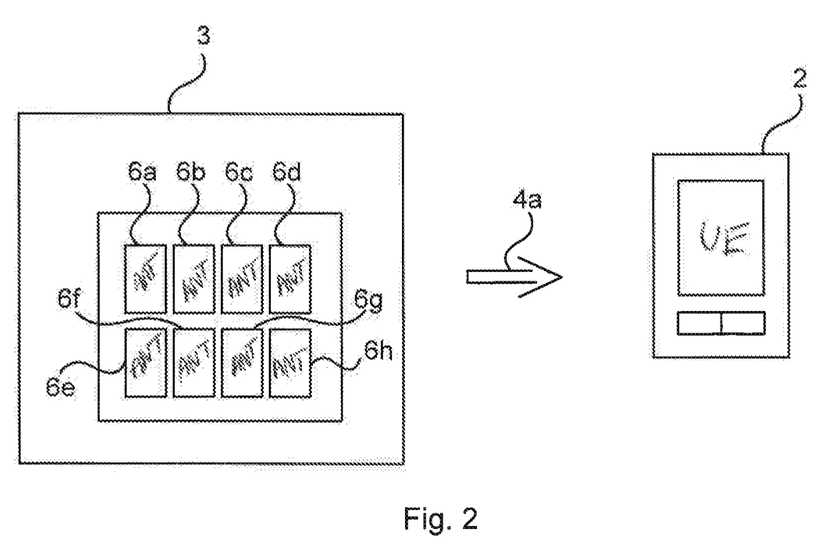
FIG. 2 is a schematic drawing illustrating downlink transmissions from the radio network node of FIG. 1 where multiple antennas are deployed.

FIG. 2 is a schematic drawing illustrating downlink transmissions from the radio network node 1 of FIG. 1 where multiple antennas are deployed. Specifically, it is here shown how the radio network node 1 comprises an AAS (Active Antenna System) and thus comprises a plurality of antennas. In this example, the radio network node 1 comprises eight antennas 6a-h. It is to be noted, however, that the radio network node can comprise any suitable number of antennas. The antennas 6a-h are here shown how they are used for downlink communication 4a from the radio network node to the wireless device 2, but the antennas can also be used for uplink communication, i.e. in the opposite direction.

Figure 3:
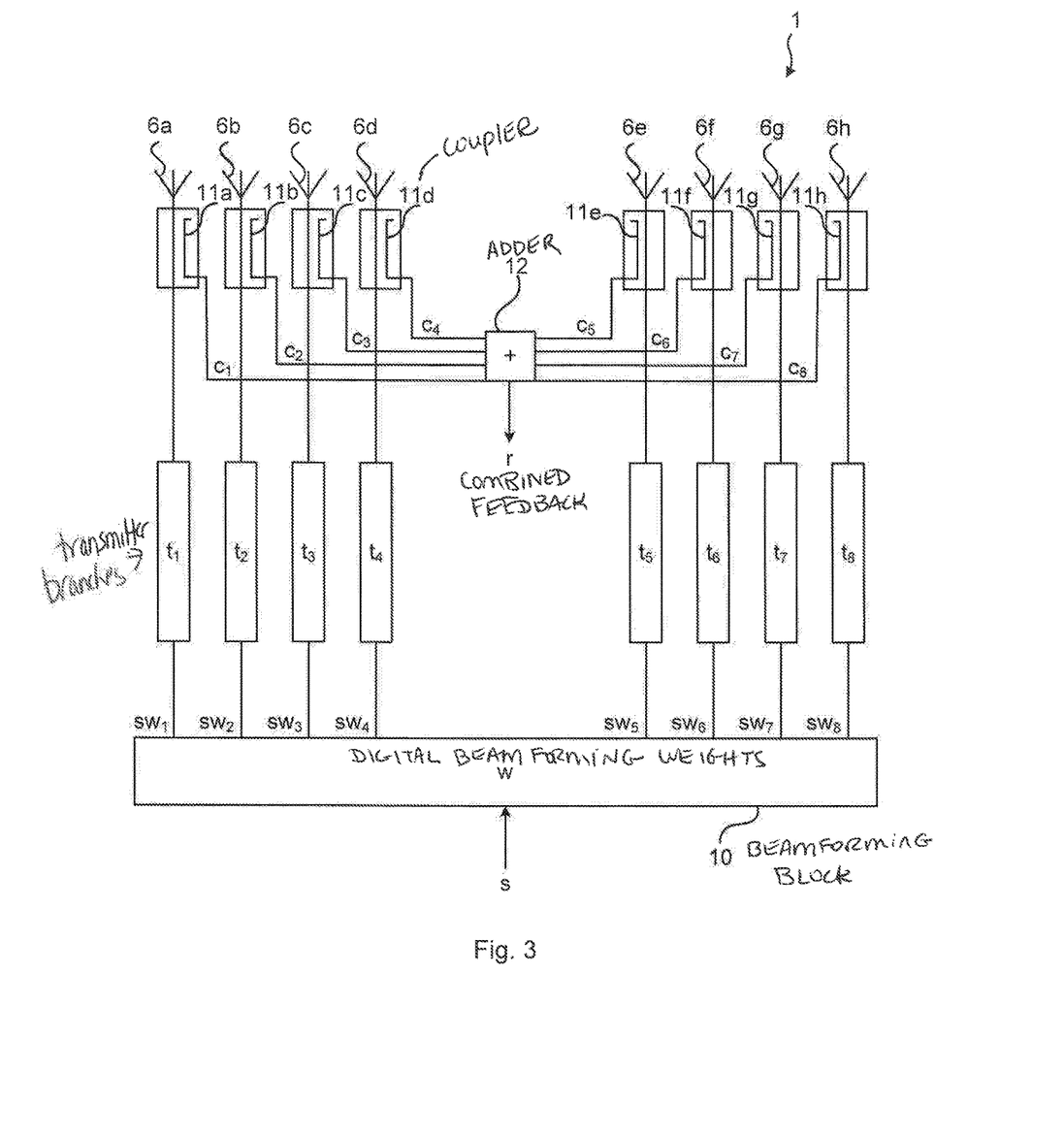
FIG. 3 is a schematic diagram illustrating the radio network node of FIG. 1 in more detail, when applied for downlink transmissions according to one embodiment.

FIG. 3 is a schematic diagram illustrating the radio network node 1 of FIG. 1 in more detail, when applied for downlink transmissions.

A beamforming block 10 applies a beamforming matrix w on an incoming transmission signal values s. The beamforming matrix w (or vector) applies individual phase and amplitude weights to the signal for each transmitter branch. The incoming transmission signal value s can be a scalar value or a vector comprising one value for each MIMO (Multiple Input Multiple Output) layer.

After applying w in the beamforming block 10, respective signals $sw1, sw2, \ldots, sw8$ are provided to each one of eight transmission branches $t_1, t_2, \ldots, t_8$. Each transmission branch $t_1$-$t_8$ converts the data in an I-Q plane to analogue signals, upconverts to RF, applies power amplification and filtering, and provides the output to respective antenna devices 6a-h. Each antenna device 6a-h handles transmit/receive switching when TDD (Time Division Duplex) is applied, optionally applies operating frequency band filtering and distributes signals to the antennas.

By each one of the antenna devices 6a-h, there is a respective coupler 11a-h, e.g. directional couplers or a sniffer antenna. The couplers 11a-h form a coupler network which provides feedback with a signal that is essentially proportional to the signal transmitted on the respective antenna device 6a-h. The feedback signals are provided to an adder 12. A respective feedback factor $c_1$-$c_8$ represents the feedback signal in comparison to the signal transmitted by the respective antenna device 6a-h, including any effects due to wiring, etc. The feedback factor is known from manufacturing or measured. The output of the adder 12 is a combined feedback r.

Beamforming performance is dependent on phase and gain stability of the transmitter branches $t_1$-$t_8$, which is ensured by antenna calibration. The antenna calibration uses the feedback of the signals from the couplers 11a-h. The signals from the couplers are summed and fed to a calibration transceiver.

In embodiments herein, the same physical structure is used also for obtaining a value of total radiated power from the radio base station.

N represents branch n, where n=1 to 8 in this example. It is very difficult to design circuits so that $t_n$ is accurately controlled. Before antenna calibration is performed, $t_n$ generally differs from branch to branch.

Prior to applying the method described below, the antenna array (i.e. the set of antenna devices 6a-6h) is calibrated. The result of the antenna calibration is that $t_n$ is the same for all transmission branches. This means that the amplitude and phase for each antenna element is calibrated relative to the other antennas. With this in place, it is known that the relative phase and amplitude offset to the signal applied in the digital domain beam forming (digital beamforming weights w), are true also at the antenna air interface.

For a successful antenna calibration, the differences of the coupled path signals, $c_n$ should preferably be zero, or at least known. This is because at the summation point, it is impossible to distinguish the effect of $c_n$ from $t_n$.

The coupled signal from each antenna is summed into one output port of the adder 12. The summation can e.g. employ a Wilkinson combiner, which sums the signal at RF frequency.

If the coupler and summation network is designed for zero phase and amplitude difference for the different antenna paths, the signal will be summed as in boresight of the antenna array. Boresight is the axis of maximum gain of the antenna array comprising the antenna devices 6a-6h. The respective signal $r_n$ into the summation point is then expressed as:

$$r_n = s w_n t_n c_n \quad (1)$$

The total summed signal r can be calculated by summing the individual elements:

$$r = \sum_{n=1}^{N} r_n = \sum_{n=1}^{N} s w_n t_n c_n \quad (2)$$

The signal power of the summed signal is denoted $P_r$ and is proportional to the squared summed signal as $$P_r = |r|^2 = \left|\sum_{n=1}^{N} r_n\right|^2 = \left|\sum_{n=1}^{N} s w_n t_n c_n\right|^2 = |s|^2 \left|\sum_{n=1}^{N} w_n t_n c_n\right|^2 \quad (3)$$

This power is hereinafter called the intermediate power value. However, the intermediate power value only expresses the signal transmitted in one specific direction. Note that in the case where $c_n$ is the same for all branches, this represents the signal power transmitted in boresight.

The coupler network and receiver are designed or calibrated so that the received power r has a known relation to what is actually radiated from each antenna. This so that the power Pr shall represent the true power level per antenna. This known relation can be obtained by measuring and/or calibrating during production e.g. by transmitting a known signal level from one antenna, and at the same time measure the intermediate power value $P_r$.

In this way, a known relation between $P_r$ and P, which is the power transmitted from the antenna device, is obtained.

But the intermediate power value is not the same as the total radiated power, which is the sum of the transmitted power per antenna. The total radiated power can be expressed as:

$$P_{tot} = \sum_{n=1}^{N} |r_n|^2 = \sum_{n=1}^{N} |s w_n t_n c_n|^2 = |s|^2 \sum_{n=1}^{N} |w_n t_n c_n|^2 \quad (4)$$

Hence, it is evident that the total radiated power $P_{tot}$ differs from the intermediate power value $P_r$. Note that $P_{tot}$ is not directly measurable since the signal is summed before it is detected.

When the antenna array is calibrated, to is the same for all branches and can be written as t without subscript. Then the expressions for $P_r$ and $P_{tot}$ evaluate to:

$$P_r = |s|^2 |t|^2 \left|\sum_{n=1}^{N} w_n c_n\right|^2 \quad (5)$$

and $$P_{tot} = |s|^2 |t|^2 \sum_{n=1}^{N} |w_n c_n|^2 \quad (6)$$

The ratio between $P_{tot}$ and $P_r$ is here denoted power factor $BF_{comp}$ and is thus:

$$BF_{comp} = \frac{P_{tot}}{P_r} = \frac{|s|^2 |t|^2 \sum_{n=1}^{N} |w_n c_n|^2}{|s|^2 |t|^2 \left|\sum_{n=1}^{N} w_n c_n\right|^2} = \frac{\sum_{n=1}^{N} |w_n c_n|^2}{\left|\sum_{n=1}^{N} w_n c_n\right|^2} \quad (7)$$

It can be seen that $BF_{comp}$ can be calculated in the digital domain, because $w_n$ and $c_n$ are known entities. This means that the measured entity $P_r$ can be corrected with a power factor $BF_{comp}$ to produce the desired measure $P_{tot}$:

$$P_{tot} = P_r BF_{comp} = P_r \frac{\sum_{n=1}^{N} |w_n c_n|^2}{\left|\sum_{n=1}^{N} w_n c_n\right|^2} \quad (8)$$

Note that the beamforming weights $w_n$ vary over time and frequency. This means that an appropriate averaging provides a more accurate result. Moreover, it can be impractical to calculate relation (8) for each time and frequency. Hence, it can be more practical to calculate an average first and then compute the power factor $BF_{comp}$ as the average. This can be expressed in the following:

$$\overline{P_{tot}} = \overline{P_r BF_{comp}} = avg(P_r) \frac{avg\left(\sum_{n=1}^{N} |w_n c_n|^2\right)}{avg\left(\left|\sum_{n=1}^{N} w_n c_n\right|^2\right)} \quad (9)$$

Where avg( ) indicates an averaging operation in time and/or in frequency domains.

The above reasoning holds for single-layer transmission. In multi-layer transmission, the transmitted signal is a sum of each layer signal. In the below, the antenna is denoted n, and the layer is denoted i. The number of antennas is denoted N and the number of layers is denoted I.

The intermediate power value is then written:

$$P_r = \sum_{i=1}^{I} |r_i|^2 = \left|\sum_{i=1}^{I} \sum_{n=1}^{N} r_{n,i}\right|^2 = \left|\sum_{i=1}^{I} \sum_{n=1}^{N} s_i w_{n,i} t_n c_n\right|^2 = |t|^2 \left|\sum_{i=1}^{I} \sum_{n=1}^{N} s_i w_{n,i} c_n\right|^2 \quad (10)$$

The total transmitted power can be calculated as:

$$P_{tot} = \sum_{i=1}^{I}\sum_{n=1}^{N}|r_{n,i}|^2 = \sum_{i=1}^{I}\sum_{n=1}^{N}|s_i w_{n,i} t_n c_n|^2 = |t|^2 \sum_{i=1}^{I}\sum_{n=1}^{N}|s_i w_{n,i} c_n|^2 \quad (11)$$

Where the last step in each expression again assumes calibration has been performed.

Thus, the $BF_{comp}$ parameter evaluates to:

$$BF_{comp} = \frac{P_{tot}}{P_r} = \frac{|t|^2 \sum_{i=1}^{I}\sum_{n=1}^{N}|s_i w_{n,i} c_n|^2}{|t|^2 \left|\sum_{i=1}^{I}\sum_{n=1}^{N} s_i w_{n,i} c_n\right|^2} = \frac{\sum_{i=1}^{I}\sum_{n=1}^{N}|s_i w_{n,i} c_n|^2}{\left|\sum_{i=1}^{I}\sum_{n=1}^{N} s_i w_{n,i} c_n\right|^2} \quad (12)$$

While there are eight branches and antenna devices shown in FIG. 3, it is to be noted that the embodiment depicted in FIG. 3 can be applied for any suitable number of transmission branches/antenna devices. Optionally, there are several groups of transmission branches/antenna devices in a radio base station, where the embodiment depicted in FIG. 3 can be applied for each such group.

Figures 4A, 4B:
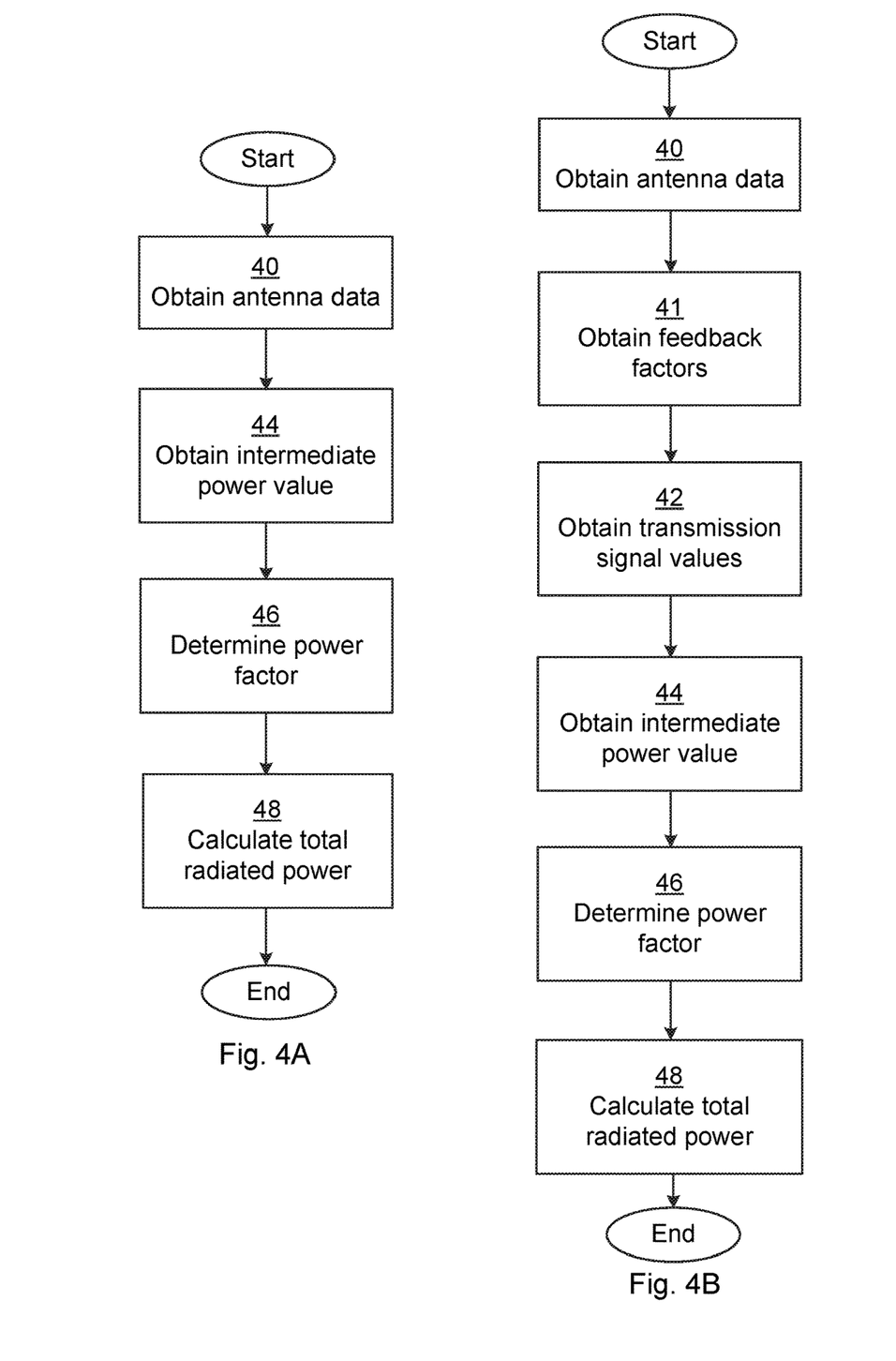
FIGS. 4A-B are flow charts illustrating embodiments of methods performed in a radio network node for determining total radiated power from a plurality of antennas.

FIGS. 4A-B are flow charts illustrating embodiments of methods performed in a radio network node for determining total radiated power from a plurality of antennas. First, embodiments related to FIG. 4A will be described.

In an obtain antenna data step 40, antenna data is obtained. The antenna data is data affecting transmission weights applied for each individual antenna of the plurality of antennas. For instance, the antenna data can comprise transmission weights applied for each individual antenna of the plurality of antennas. Alternatively, the antenna data comprise parameters in beam space, i.e. parameters for each beam rather than for each antenna device. When the antenna data is provided in beam space, each antenna calculates the weights to be applied for itself based on the beam space parameters. Analogously, the weights applied for each antenna can be calculated in this step based on the beam space parameters.

In an obtain intermediate power value step 44, an intermediate power value $P_r$ is obtained. The intermediate power value is based on a sum of signals from couplers provided by each antenna of the plurality of antennas.

In a determine power factor step 46, a power factor is determined based on the antenna data. Optionally, this step comprises determining the average power factor for a predetermined time period, e.g. as expressed in (11) above.

In a calculate total radiated power step 48, the total radiated power is calculated based on the intermediate power value and the power factor. For instance, the total radiated power can be calculated by multiplying the intermediate power value by the power factor.

Looking now to FIG. 4B, only new or modified steps compared to FIG. 4A will be described.

In an obtain feedback factors step 41, feedback factors for each coupler feedback line are obtained. In such a case, in the determine power factor step 46, the power factor is also based on the feedback factors. For instance, the power factor can be calculated according to:

$$BF_{comp} = \frac{\sum_{n=1}^{N}|w_n c_n|^2}{\left|\sum_{n=1}^{N} w_n c_n\right|^2} \quad (12)$$

as expressed in (7) above, where $BF_{comp}$ is the power factor, N is the number of antennas, $w_n$ is the transmission weight for antenna n, and $c_n$ is the feedback factor for coupler connected to antenna device n.

In an obtain transmission signal values step 42, transmission signal values for each antenna of the plurality of antennas are obtained. In such a case, the step of determining (46) a power factor is also based on the transmission signal values. For instance, the power factor can be calculated according to:

$$BF_{comp} = \frac{\sum_{n=1}^{N}|s_n w_n c_n|^2}{\left|\sum_{n=1}^{N} s_n w_n c_n\right|^2} \quad (13)$$

as expressed in (10) above, where $BF_{comp}$ is the power factor, N is the number of antennas, $s_n$ is the transmission signal value for antenna n, $w_n$ is the transmission weight for antenna n, and $c_n$ is the feedback factor for coupler connected to antenna n.

This method enables true measurement of the AAS radio base station transmitted power including effects of e.g. tapering the signal amplitude across the subarrays or when a part of the array is turned off due to e.g. power save features. One issue with measuring the power based on a summed coupled signal is that any beam forming weights will have impact on the result, both the amplitude and phase of the beamforming weights decides the coupled signal level at the summed coupler port and for a phase coherent coupler network it is equivalent to measuring the power in bore sight only. As the beamforming is known since it is performed in the beamforming block, using this method, the total radiated power is calculated taking these into account.

Once the total radiated power is calculated in this method, the value can be provided to operator software, e.g. using an operation and maintenance interface. It is to be noted that using the methods illustrated by FIGS. 4A-B, the total radiated power can be calculated without interrupting or modifying currently active transmissions.

Figure 5:
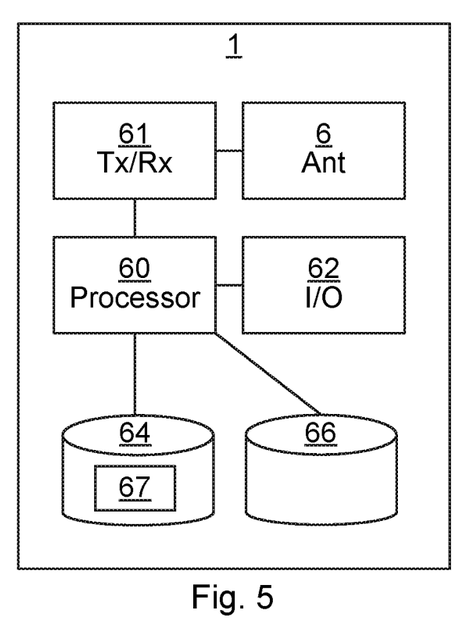
FIG. 5 is a schematic diagram illustrating components of the radio network node of FIG. 1.

FIG. 5 is a schematic diagram illustrating components of the radio network node 1 of FIG. 1. A processor 60 is provided using any combination of one or more of a suitable central processing unit (CPU), multiprocessor, microcontroller, digital signal processor (DSP), application specific integrated circuit etc., capable of executing software instructions 67 stored in a memory 64, which can thus be a computer program product. The processor 60 can be configured to execute the method described with reference to FIGS. 4A and 4B above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 66 is also provided for reading and/or storing data during execution of software instructions in the processor 60. The data memory 66 can be any combination of read and write memory (RAM) and read only memory (ROM).

The radio network node 1 further comprises an I/O interface 62 for communicating with other external entities. Optionally, the I/O interface 62 also includes a user interface.

A transceiver 61 comprises suitable analogue and digital components to allow signal transmission and signal reception with a wireless device using one or more antennas 63.

Other components of the radio network node 1 are omitted in order not to obscure the concepts presented herein.

Figure 6:
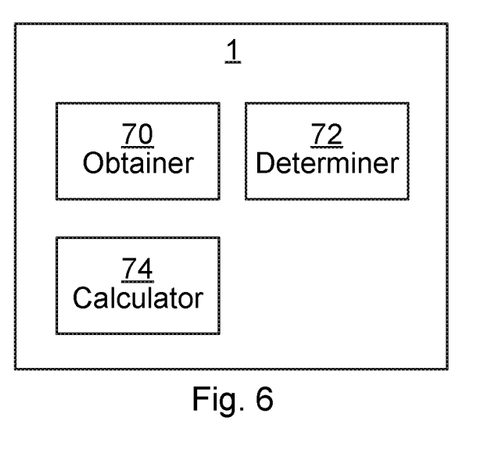
FIG. 6 is a schematic diagram showing functional modules of the radio network node of FIG. 1 according to one embodiment.

FIG. 6 is a schematic diagram showing functional modules of the radio network node 1 of FIG. 1 according to one embodiment. The modules are implemented using software instructions such as a computer program executing in the radio network node 1. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 4A and 4B.

An obtainer 70 corresponds to steps 40, 41, 42 and 44. A determiner 72 corresponds to step 46. A calculator 74 corresponds to step 48.

Figure 7:
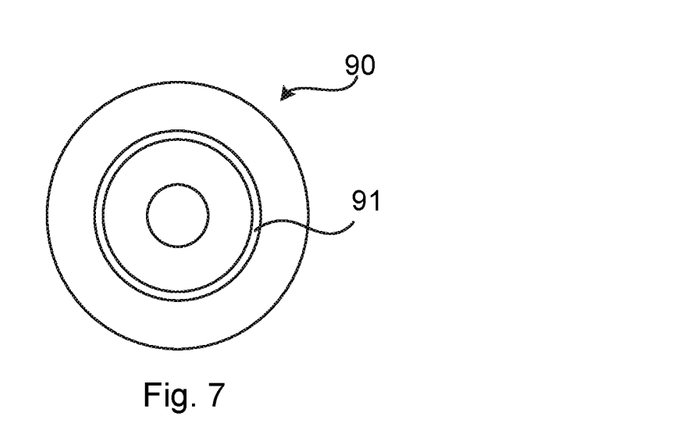
FIG. 7 shows one example of a computer program product comprising computer readable means.

FIG. 7 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 5. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for determining total radiated power from a plurality of antennas, the method being performed in a radio network node and comprising the steps of:
obtaining antenna data affecting transmission weights applied for each individual antenna of the plurality of antennas;
obtaining an intermediate power value based on a sum of signals from couplers provided by each antenna of the plurality of antennas;
determining a power factor based on the antenna data; and
calculating the total radiated power based on the intermediate power value and the power factor.

2. The method according to claim 1, wherein the antenna data comprises transmission weights applied for each individual antenna of the plurality of antennas.

3. The method according to claim 1, further comprising the step of:
obtaining feedback factors for each coupler feedback line; and
wherein the step of determining a power factor is also based on the feedback factors.

4. The method according to claim 3, wherein the step of determining a power factor comprises determining the power factor according to:

$$BF_{comp} = \frac{\sum_{n=1}^{N} |w_n c_n|^2}{\left|\sum_{n=1}^{N} w_n c_n\right|^2},$$

where $BF_{comp}$ is the power factor, N is the number of antennas, $w_n$ is the transmission weight for antenna n, and $c_n$ is the feedback factor for coupler connected to antenna n.

5. The method according to claim 1, further comprising the step of:
obtaining transmission signal values for each antenna of the plurality of antennas; and
wherein the step of determining a power factor is also based on the transmission signal values.

6. The method according to claim 5, wherein the step of determining a power factor comprises determining the power factor according to:

$$BF_{comp} = \frac{\sum_{i=1}^{I} \sum_{n=1}^{N} |s_i w_{n,i} c_n|^2}{\left|\sum_{i=1}^{I} \sum_{n=1}^{N} s_i w_{n,i} c_n\right|^2},$$

where $BF_{comp}$ is the power factor, N is the number of antennas, $s_i$ is the transmission signal value for layer i, $w_{n,i}$ is the transmission weight for antenna n and layer i, and $c_n$ is the feedback factor for coupler connected to antenna n.

7. The method according to claim 1, wherein the step of determining a power factor comprises determining the average power factor for a predetermined time period.

8. The method according to claim 1, wherein the step of determining a power factor comprises averaging the power factor in a frequency domain.

9. The method according to claim 1, wherein the step of calculating the total radiated power comprises calculating the total radiated power by multiplying the intermediate power value by the power factor.

10. A radio network node for determining total radiated power from a plurality of antennas, the radio network node comprising:
a processor; and
a memory storing instructions that, when executed by the processor, cause the radio network node to:
obtain antenna data affecting transmission weights applied for each individual antenna of the plurality of antennas;
obtain an intermediate power value based on a sum of signals from couplers provided by each antenna of the plurality of antennas;
determine a power factor based on the antenna data; and
calculate the total radiated power based on the intermediate power value and the power factor.

11. The radio network node according to claim 10, wherein the antenna data comprises transmission weights applied for each individual antenna of the plurality of antennas.

12. The radio network node according to claim 10, further comprising instructions that, when executed by the processor, cause the radio network node to:
   obtain feedback factors for each coupler feedback line; and
   wherein the instructions to determine a power factor comprise instructions that, when executed by the processor, cause the radio network node to determine the power factor also based on the feedback factors.

13. The radio network node according to claim 12, wherein the instructions to determine a power factor comprises instructions that, when executed by the processor, cause the radio network node to determine the power factor according to:

$$BF_{comp} = \frac{\sum_{n=1}^{N} |w_n c_n|^2}{\left|\sum_{n=1}^{N} w_n c_n\right|^2},$$

where $BF_{comp}$ is the power factor, N is the number of antennas, $w_n$ is the transmission weight for antenna n, and $c_n$ is the feedback factor for coupler connected to antenna n.

14. The radio network node according to claim 10, further comprising the instructions that, when executed by the processor, cause the radio network node to:
   obtain transmission signal values for each antenna of the plurality of antennas; and
   wherein the instructions to determine a power factor comprise instructions that, when executed by the processor, cause the radio network node to determine the power factor also based on the transmission signal values.

15. The radio network node according to claim 14, wherein the instructions to determine a power factor comprise instructions that, when executed by the processor, cause the radio network node to determine the power factor according to:

$$BF_{comp} = \frac{\sum_{i=1}^{I}\sum_{n=1}^{N} |s_i w_{n,i} c_n|^2}{\left|\sum_{i=1}^{I}\sum_{n=1}^{N} s_i w_{n,i} c_n\right|^2},$$

where $BF_{comp}$ is the power factor, N is the number of antennas, $s_i$ is the transmission signal value for layer i, $w_{n,i}$ is the transmission weight for antenna n and layer i, and $c_n$ is the feedback factor for coupler connected to antenna n.

16. The radio network node according to claim 10, wherein the instructions to determine a power factor comprises instructions that, when executed by the processor, cause the radio network node to determine the average power factor for a predetermined time period.

17. The radio network node according to claim 10 wherein the instructions to determine a power factor comprise instructions that, when executed by the processor, cause the radio network node to average the power factor in a frequency domain.

18. The radio network node according to claim 10, wherein the instructions to calculate the total radiated power comprise instructions that, when executed by the processor, cause the radio network node to calculate the total radiated power by multiplying the intermediate power value by the power factor.

19. A radio network node comprising:
   means for obtaining antenna data affecting transmission weights applied for each individual antenna of a plurality of antennas;
   means for obtaining an intermediate power value based on a sum of signals from couplers provided by each antenna of the plurality of antennas;
   means for determining a power factor based on the antenna data; and
   means for calculating the total radiated power based on the intermediate power value and the power factor.

20. A non-transitory computer readable medium for determining total radiated power from a plurality of antennas, the non-transitory computer readable medium comprising computer program code which, when run on a radio network node causes the radio network node to:
   obtain antenna data affecting transmission weights applied for each individual antenna of the plurality of antennas;
   obtain an intermediate power value based on a sum of signals from couplers provided by each antenna of the plurality of antennas;
   determine a power factor based on the antenna data; and
   calculate the total radiated power based on the intermediate power value and the power factor.

* * * * *